No. 11,856. Reissued Sept. 18, 1900.

S. W. WARDWELL, JR.

METHOD OF WINDING COPS.

(Application filed July 14, 1899.)

5 Sheets—Sheet 1.

Witnesses
J. G. Hinkel
J. J. McCarthy.

Inventor
Simon W. Wardwell, Jr.
by
Foster & Freeman
Attorneys

No. 11,856.

Reissued Sept. 18, 1900.

S. W. WARDWELL, Jr.

METHOD OF WINDING COPS.

(Application filed July 14, 1899.)

5 Sheets—Sheet 2.

Witnesses

J. G. Tinkel

J. J. McCarthy

Inventor

Simon W. Wardwell Jr.

by Foster & Freeman

Attorneys

No. 11,856.

Reissued Sept. 18, 1900.

S. W. WARDWELL, JR.

METHOD OF WINDING COPS.

(Application filed July 14, 1899.)

5 Sheets—Sheet 3.

Witnesses

J. G. Hinkel

J. J. McCarthy.

Inventor

Simon W. Wardwell Jr.

by Foster & Freeman

Attorneys

No. 11,856.

Reissued Sept. 18, 1900.

S. W. WARDWELL, JR.

METHOD OF WINDING COPS.

(Application filed July 14, 1899.)

5 Sheets—Sheet 4.

Witnesses

T. L. Mockabee

J. J. McCaskey

Inventor

Simon W. Wardwell Jr.

By Porter E. Brennan

Attorneys

No. 11,856.

Reissued Sept. 18, 1900.

S. W. WARDWELL, JR.

METHOD OF WINDING COPS.

(Application filed July 14, 1899.)

5 Sheets—Sheet 5.

Witnesses

T. L. Mockabee

J. J. McCarthy.

Inventor

Simon W. Wardwell Jr.

by Foster & Freeman

Attorneys

UNITED STATES PATENT OFFICE.

SIMON W. WARDWELL, JR., OF PROVIDENCE, RHODE ISLAND, ASSIGNOR, BY MESNE ASSIGNMENTS, TO THE UNIVERSAL WINDING COMPANY, OF PORTLAND, MAINE.

METHOD OF WINDING COPS.

SPECIFICATION forming part of Reissued Letters Patent No. 11,856, dated September 18, 1900.

Original No. 480,158, dated August 2, 1892. Application for reissue filed July 14, 1899. Serial No. 723,845.

*To all whom it may concern:*

Be it known that I, SIMON W. WARDWELL, Jr., a citizen of the United States, residing at Providence, in the county of Providence, State of Rhode Island, have invented an Improved Method of Winding Cops, of which the following is a specification.

My invention relates to a systematic winding of thread to form a solid cop, absolutely uniform throughout, whereby the thread will be delivered in unwinding from every part of the cop without irregular resistance or tangling, as fully set forth hereinafter and as illustrated in the accompanying drawings, in which—

Figure 5:
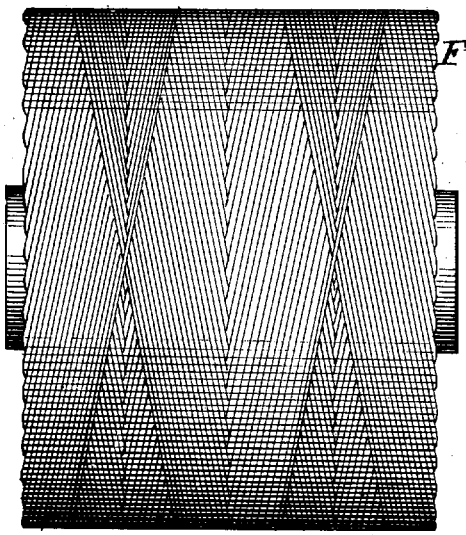
Figure 4:
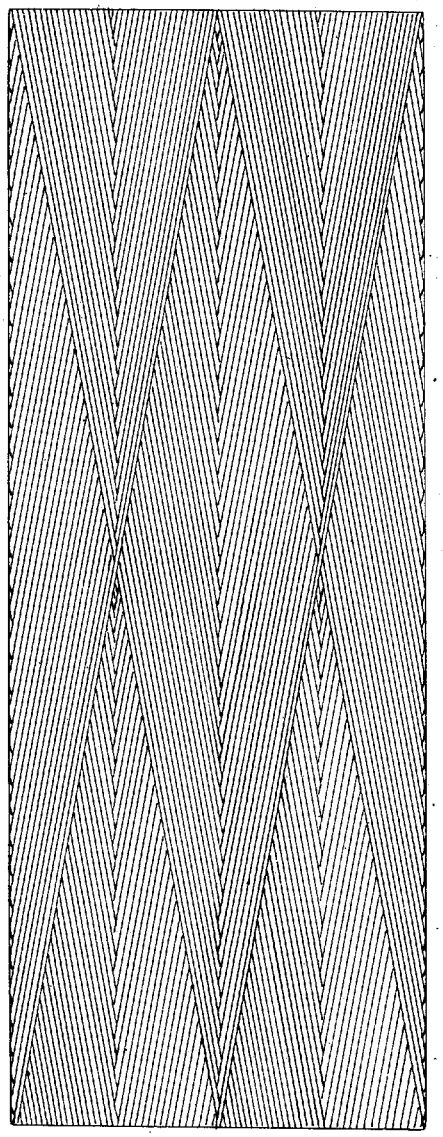
Figure 1:
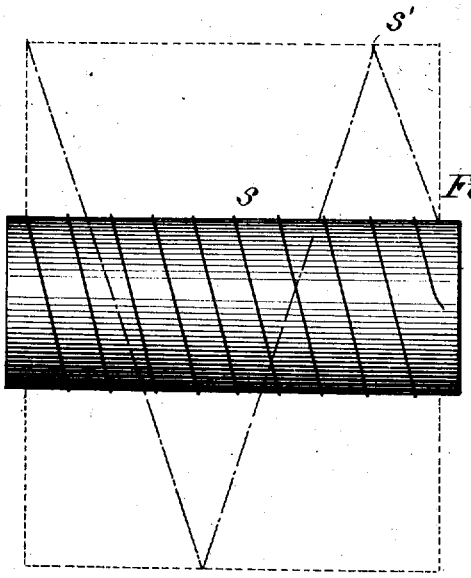
Figure 3:
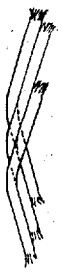
Figure 6:
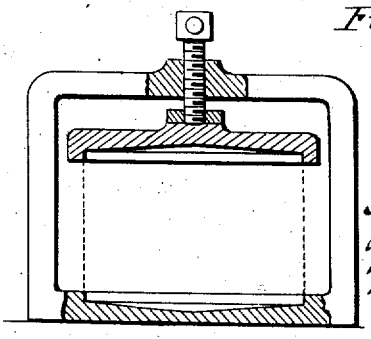
Figure 2:
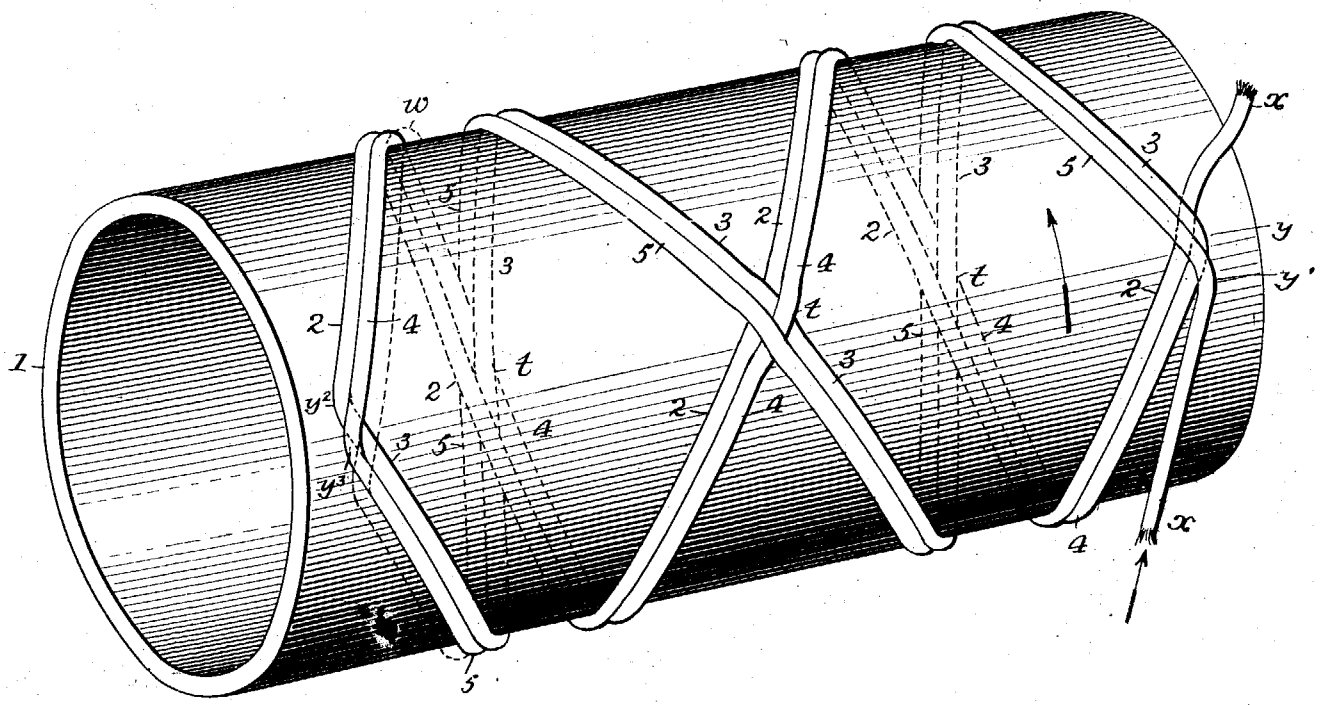
Figure 7:
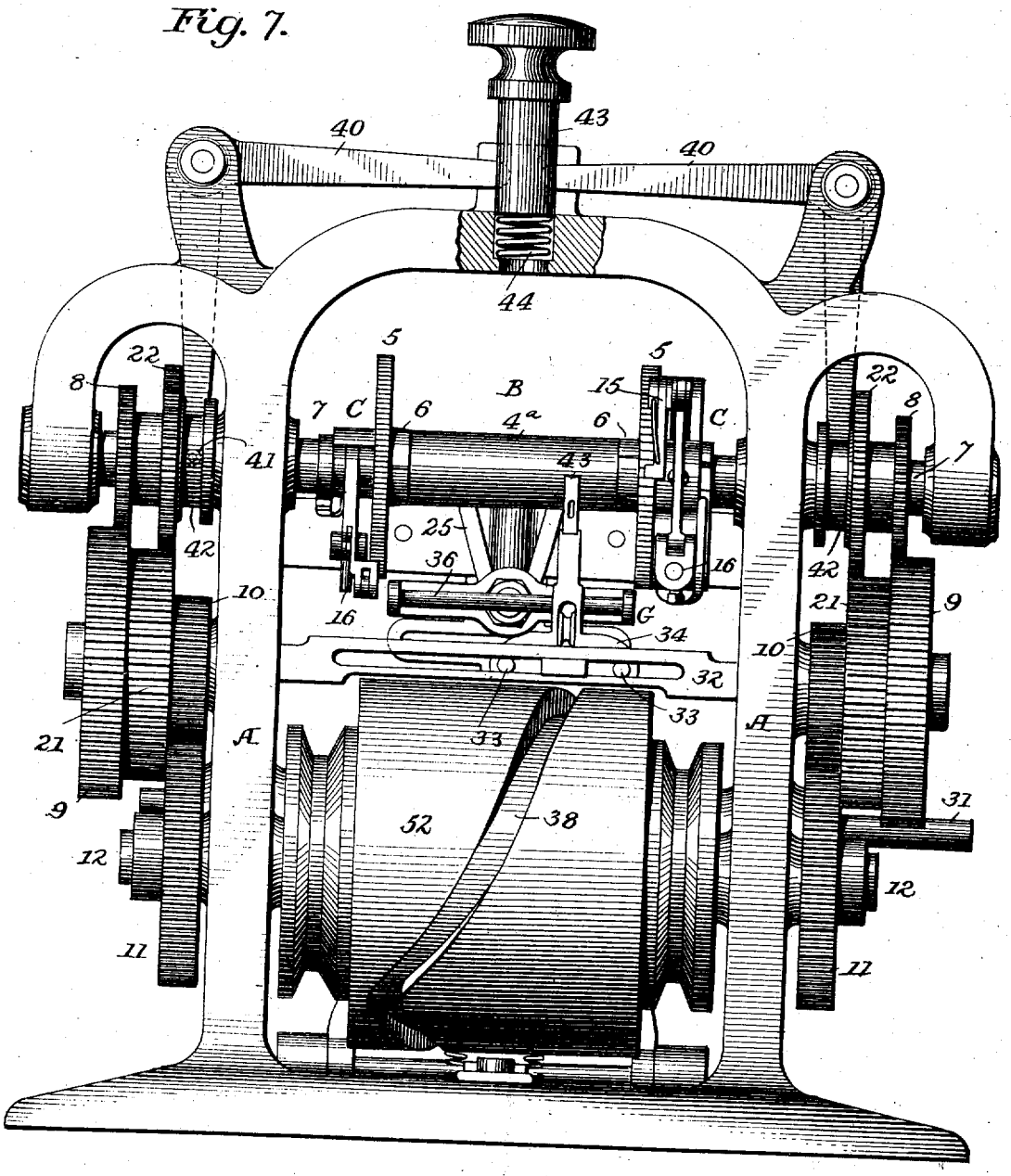
Figure 8:
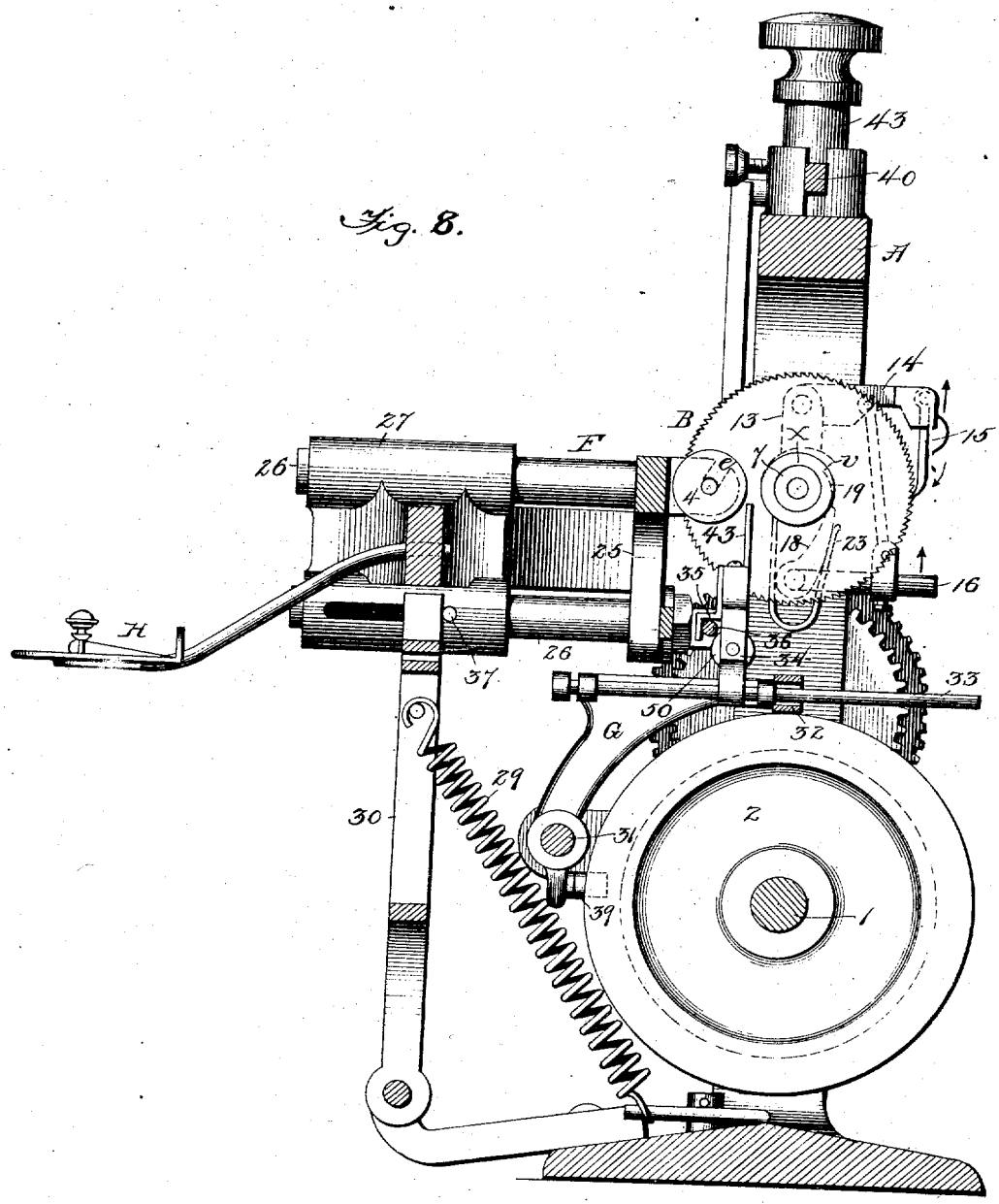
Figure 9:
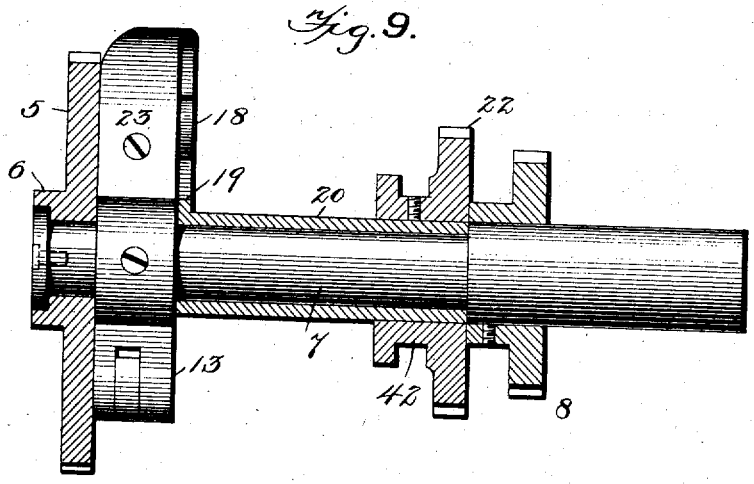
Figure 10:
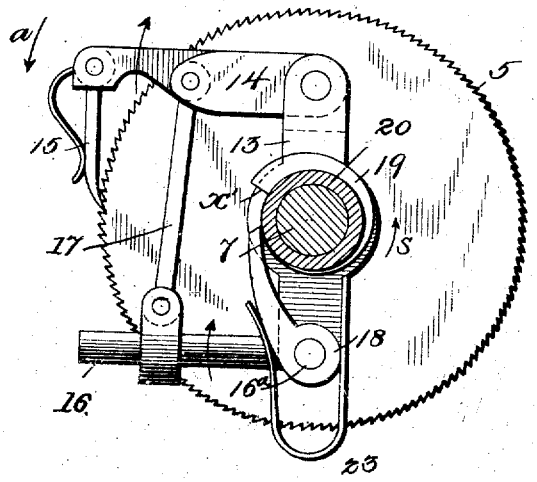

Figure 1 is a diagrammatic view illustrating the disposition of thread in one of the ordinary modes of winding; Fig. 2, a perspective view, enlarged, showing the manner in which the thread is systematically laid in starting a cop by my improved method. Fig. 3 is an enlarged view illustrating the lay of the thread at one end of a cop; Fig. 4, a view showing the surface of the thread of one of the improved cops as flattened out to a plane and illustrating the lay of the thread; Fig. 5, a view of the improved cop; Fig. 6, a sectional view of the cop-press; Fig. 7, a front elevation of the winding-machine; Fig. 8, a transverse elevation of said machine; Figs. 9 and 10, detached views of parts of the machine.

While heretofore in the construction of cops many efforts have been made to improve the general construction and appearance, it seems to have been recognized that it was not practicable to avoid an irregular disposition of the thread at the center of the cop, and consequently while the main body of the cop might be unwound without material difficulty in unwinding the inner portion the thread would become entangled and lost, as in cops of binder-twine, or the irregular delivery would prevent use for many purposes, as in cops for knitting and sewing machines where spooling was generally resorted to because of the imperfections of cops as usually wound.

In the methods most commonly heretofore used in winding balls or cops of yarn, thread, cord, or rope the thread is conducted to a revolving cylinder or tube and carried transversely first to one end and then to the other of the latter, laying it sometimes in inclined rings and sometimes in irregular coils, but without insuring any regular or uniform or systematic placing of the thread on the core, the irregularity being increased in most instances by the arrangement of the guide-eye distant from the cop, which permits a play of the thread between the guide and cop and prevents any systematic or regular deposit of the thread. In such modes of building up a cop the thread if laid in rings (as results from a half-revolution of the cylinder to each traverse of the thread-guide in one direction) will not retain the position in which it is deposited on the cylinder, because of the slippage of the rings inward from each end and piling together at the center, thus forming a central rounded rib much narrower than the length of the completed cop, and this will gradually expand as successive rings are laid, until finally the cylinder is covered the length of the cop, but with an irregular core thicker at the center than at the ends, and the cop is completed either in a ball form or attains a cylindrical shape only after a large portion of the same has been wound.

In the ordinary "surface-wound" cop, constituting one of the principal winds in use where the cop is driven by contact with a revolving cylinder, the thread is wound in irregular coils upon the tube. No attempt is made to place the successive coils of thread in contact with each other upon the tube at the first winding nor thereafter, nor to arrange them with any precision, so as to preserve their parallelism throughout the winding, and the thread is carried in coils along the length of the tube during its revolution in such a manner that the number of turns to each traverse decreases as the diameter of the cop increases, as illustrated in Fig. 1, in which the lines *s* indicate the first coil upon the tube and the dotted lines *s'* the coil upon the exterior of a cop several inches in diameter. As a consequence the winding is irregular, the threads are not parallel in the successive coils, the cop is open or loose and lacks firmness and solidity, and the thread is not evenly laid. In other cases the apparatus is constructed and timed to lay the first coils the length of the cop but irregularly, building up the cop with a cross-winding of the coils, many of which are piled on each other, and in other instances in making narrow cops the thread is carried from end to end of the cop several times in each revolution of the cylinder, but without any uniformity in the disposition of the thread, especially at the center. All of these usual modes of building up cops result in cops in the different parts of which the thread is laid differently, which are therefore built up in an unsystematic and irregular way, and as a consequence the thread will not deliver uniformly in the unwinding of a cop, but will at times unwind or pass off freely, while at others it will stick or resist the draft more or less. In parts of cops wound in any of the usual modes portions of the thread when a cop is on end will underlie other portions or cross tangentially the lower end of the cop, so that in unwinding the thread catches beneath the end of the cop and is either broken or retarded in its delivery. In all the usual winds, even in those where the greater body of the cop is somewhat uniform, the inner portion nearest the center is irregular and results in uneven friction and irregular delivery, interfering with the use of the cops thus wound for many purposes and necessitating the rewinding or "spooling" of the thread in many instances.

Owing to the irregular and unsystematic laying of the thread in ordinary cops they lack compactness, firmness, and density, the air and moisture can penetrate the interstices and injure the fibers, the cops will crush and lose shape under pressure, and in crushing the thread will be indented by the separate coils against which it is pressed.

To produce a cop open to none of the objections incident to those wound as usual, I wind the same systematically from beginning to finish, depositing each portion of thread in the position it is to occupy in the completed cop and so that it will retain such position and lay each portion of thread in a determined relation to every other portion, whereby for the first time to secure a cop that is uniform in character throughout and capable of being extended in length to any required degree without altering in the least its other characteristics. In securing these results I lay the thread in crossed helices on a cylinder—that is, each portion of thread between the ends is so laid around the cylinder that when reversed and carried in like manner to the opposite end it will cross and tie down the thread of the part first laid at one or more points. The cop is built up of such portions of thread, all alike as regards their length and the number of turns in each and their intersections with reverse portion. These portions to intersect between the ends must extend more than half-way around the cylinder in passing from end to end of the cop and may otherwise be of any desired length, and I term them "helices." The helices wound in each direction are laid parallel and substantially in contact until the core is covered, and then I have the novel result of a cop with a first or foundation layer or core consisting of two series of crossed helices together covering completely the cop tube or cylinder the entire length of the cop, the parallel helices substantially in contact, and the cop is built up by a succession of such layers, each covering the layer below, the length of the cop and each consisting of superposed series of helices. While the number of turns in each helix is immaterial, the crossing of the helices, which is one of the essential features of my improvement, cannot be had unless the thread be carried more than half-way around the cop in each helix, and practically to secure a cop of a commercial character it is desirable that the thread in each helix should make substantially at least one complete turn in passing from end to end of the cop. After making a complete turn it may be reversed after additional turns or fractions of a turn.

It will be evident from the above that by the term "helix," as used herein, is meant a portion of thread carried more than a half-rotation around the cop-tube or cop in extending from end to end of the same, so that of necessity when the thread is reversed and laid in a return helix the two will be crossed at least once between the ends of the cop. In the cop thus made, therefore, each helix extends between the two ends of the cop and all have substantially the same number of turns in each layer of the winding—that is, if the thread laid directly upon the surface of the cylinder or tube is coiled around the latter twice or makes two turns in extending from one end of the cop to the other every portion of thread extending from end to end in every layer of the cop will also make two turns or substantially two turns and each helix in passing from end to end of the cop crosses other helices the same number of times as every other helix.

As illustrating the manner in which the thread is laid upon the tube or cylinder to form a layer and thereafter in successive layers of the cop, I refer to Fig. 2, showing several helices of the thread within the limits of the length of the cop as wound on a tube X. 2 represents the first helix of the thread $x$, the end of which is secured in any suitable manner, which helix winds or turns twice in traversing the length of the cop and then twice in returning, and 3 4 5, &c., represent the succeeding helices. Assuming that the cylinder is turning in the direction of the arrow the thread $x$, in laying the helix 4 before it reaches the bend $y^2$ where the helix 2 reversed its direction and became the helix 3, will be laid upon the inside of the thread of the helix 2, and then upon reaching the bend $y^2$ will be carried over and across the thread of the helix 3 at a point beyond the bend $y^2$ in the periphery of the cop and will then be bent back with a sharp bend $y^3$, and upon the further revolution of the tube the thread will be laid on the outside of the thread of the helix 3 and will follow said helix throughout its convolutions to the opposite end of the cop, crossing the preceding helix and tying it down at points $t$ $t$ and then back and will be laid on the right-hand side of the thread of the helix 4 and beyond the bend $y$ will cross the threads of the helices 2 and 4 and then be carried back, forming a bend $y'$. This is the course of each helix or thread in each layer of the cop, so that each helix in each layer lies parallel throughout its length to the thread of a previously-laid helix, and at each end of the cop the thread is bent abruptly, forming a sharp bend or knuckle where the thread crosses over the bend of the thread of a previous helix at that end, the bend of the thread of each helix at each end being a short distance in the periphery of the cop in advance of the bend of the helix previously laid at that end, and the bend at one end of each helix being at a point circumferentially in advance, or what is the same, back of the bend of said helix at the opposite end of the cop. The cop thus formed of helices each having one or more turns in each length of thread between the ends of the cop is illustrated in Figs. 4 and 5, from which it will be seen that the bends or knuckles constitute the ends of the cop.

While it is not absolutely necessary, it is in many cases preferable that the thread of each helix shall be in actual contact with as well as parallel to the threads of the preceding helix, so as to bring the helices into close proximity and secure a cop of minimum size and maximum density. In some instances where it is desired to secure absolute uniformity in the external dimensions of the cops produced the same may be wound with the succeeding helices parallel but not absolutely in contact, and the cops may then be subjected to end pressure between dies, Fig. 6, whereby the separated threads of the succeeding helices are brought together to the desired extent. By using dies of the proper form the ends of the cop may be made slightly convex or conical, if desired. It will be evident that as the separated helices of the cop thus wound were uniformly and regularly laid the pressure upon the ends moves the helices closer together, and thereby compacts the cop by this means and not, as when an irregularly-wound cop is compressed, by forcing one thread into another and compressing and condensing the threads themselves, which results in crushing and breaking the fibers.

Among the advantages of a cop wound as above described over ordinary cops are the following: In the first place the same amount of thread may be laid into a much smaller space, thus securing economy in packing, storage, and transportation. Again, in consequence of the regularity of winding, the thread may be unwound from the cop without danger of entanglement, and loss is thus prevented, while the resistance and delivery are substantially uniform, so that the necessity of spooling the thread to secure an even delivery is avoided, and it will be noted as one of the most important improvements over prior cops that this applies as well to the first helices of the core of the cop as to the last. In consequence of the density and firmness of the cop it will maintain its shape and integrity until the thread is completely wound off, and in shipping the cops do not get crushed out of shape and the helices of thread tangled together. In consequence of the regularity and solidity of the cop, especially such as are used in sewing-machines and other machines of like character, it is practicable to apply the tension directly to the cop itself with uniform results down to the core or first helices of thread laid, which cannot be done with those wound as usual. In consequence of the close winding the thread retains the moisture absorbed during the process of manufacture, which is a matter of much importance, as in cops as usually wound the admission of air to the interstices of the cop causes evaporation, which dries and rots the thread and is otherwise detrimental. As the successive helices are all brought close together in uniform layers, each layer constitutes a practically-even foundation for the succeeding layer and there is no such abrading or cutting as results in irregularly-wound cops, and it is found that the same pressure that would mar the thread of an ordinarily-wound cop has no detrimental effect upon one wound as above set forth. Ordinarily in drawing the thread from cops wound in the ordinary manner they are set upon transverse shafts or supports and are unwound by drawing the thread tangentially. Very frequently, in consequence of the irregularity of the winding, when the thread reaches the end of the cop it slips down or crosses the end of the cop, so as to either increase the friction or sometimes gets entangled and breaks. This cannot occur with a cop wound in regular uniform layers as above described.

In unwinding the improved cop when stood on end the thread the moment it reaches the lower end of the cop takes another direction across the face of the cop, so that it cannot under any circumstances fall down or under and across the lower end of the cop and become entangled or afford any additional friction in delivery.

One of the important results of this mode of building up a cop is the capacity to manufacture cops of any desired length without in the least affecting the lay of the thread or the character of the article. A distinctive peculiarity of my cop is the successive similar layers, on each of which two superposed series of helices constitute the layer completely covering the layer or core below.

The appearance of the cop is a matter which is commercially of great importance. The ordinarily loosely wound cop is by no means attractive, while it impresses the holder with the idea of entanglement and incapacity to maintain its shape. The cop wound in the manner above set forth presents a solid substantial appearance, is symmetrical and artistic in its general shape, and attractive commercially.

In referring to the cop as having the helices with the same number of turns in each layer I do not limit myself to exact and mathematical precision in the number; but such precision is practically desirable, and just in proportion as it is secured the cop is more perfect.

While the mode of laying reversed helices to first cover the cylinder or cop tube forming a layer of two superposed series of helices and then laying a series of such layers forming a cop with the ends constituted by bends or knuckles of the thread may be done by hand, the commercial manufacture of the cops requires the use of mechanism.

Whatever the general form of apparatus employed, it is essential that there shall be a cop-holder, which may be of any form of device to support the cop tube or cylinder, means for rotating such holder, a guide and means for reciprocating it parallel to the face of the holder, means for securing such a relative rotation of holder, and reciprocation of guide that the thread will be laid in reverse helices, crossing each other one or more times between the ends of the cop. It is further essential in order to precisely dispose the thread in the cop, as above described, to deliver the thread close to the periphery of the cop with the eye or delivery point of the guide at the point where the thread is laid upon the cop and that devices of such a character must be used that after the thread of each helix is brought to one end of the cop there will either be delay in the action in returning the thread-guide toward the opposite end or else the revolution of the cop-holder must be continued until the thread that is being laid is carried over and across the previously-laid thread, so that in the actual operation of winding the cylinder not only completes the revolution or revolutions necessary to wind each portion of thread between the ends into a helix with the proper number of turns between the ends, but there is also an additional or progressive movement, or, what is the equivalent, a delay in its movement of an extent equal to the distance necessary to carry the thread being laid to the outside of the thread previously laid, so that the successive bends of the successively-laid helices are never one above the other, but are uniformly disposed one beyond the other in the periphery of the cop.

In the drawings I have shown one form of apparatus which is effective in securing the above-described results.

The frame A is suitably constructed to support the operating parts hereinafter described, among which are a tube or cylinder holder B and a guide 43 and means for rotating said cylinder-holder and imparting a reciprocating motion to the guide in a line parallel to the axis of the cylinder-holder and for carrying back the guide as the size of the cop increases. These parts are so constructed that a cylinder or tube X may be applied to and supported by the holder B and rotated therewith and that the yarn $x$ is supported and carried to the eye of the guide 43 at the point where the guide makes contact with the cop—that is, arranged to deliver the thread at a point close to the periphery of the cop—thus preventing play of the thread between the guide and cop and laying it that it will remain in the position it is to occupy in the completed cop, and means are employed whereby the holder is so rotated that as the thread is brought to either end of the cop the rotation will continue at an increased speed, or such an increased or decreased movement is otherwise imparted to the holder as will insure that the helix last laid shall be completed with the bend at a point circumferentially beyond or back of that of the previous helix, or so that if the rotation of the holder is uniform the change of direction of the thread being laid shall be delayed by the delaying of the reversing movement of the guide until said thread being laid has crossed the thread of the preceding helix. Different means may be employed for causing such a relative variation of movement as will effect the above-described result. Thus in the construction shown in Figs. 7 to 10 the holder B consists of conical hubs 6 6 on two disks 5 5, capable of being separated to receive between them the tube $x$, Fig. 3, each of which is carried to turn independently upon the end of a short shaft 7, Figs. 1 and 4, which, together with the holder, is driven at a uniform speed by means of a pinion 8 and gear-wheel 9, driven through the medium of gears 10 and 11 from the driving-shaft 12. To the shaft 7 is secured fixedly a cross-arm 13, carrying a lever 14, to the outer end of which is pivoted a spring-pawl 15, that engages teeth upon the periphery of the adjacent disk 5, so that as the shaft 7 revolves in the direction of its arrows, Fig. 10, the disk will be carried by and with said shaft. At the opposite end of the arm 13 is a rock-shaft $16^a$, carrying arms 16 and 18. The arm 16, connected by a rod 17 with the lever 14 and the arm 18, extends over a cam 19 upon a sleeve 20, turning upon the shaft 7 and driven from the shaft 12 through the medium of the gears 11, 10, 21, and 22. The shaft 7 and the sleeve 20 turn in the same direction; but the revolution of one—for instance, the sleeve 20—is retarded, so that periodically the end of the arm 18, which is pressed down by a spring 23, will escape from the projecting portion $x'$ of the cam 19, thereby rocking the shaft 16[a] and throwing the arm 16, lever 14, and pawl 15 in the direction of their arrows, Fig. 10, so that as the further revolution of the shaft 7 and cross-bar 13 is continued the arm 18 will ride up the cam gradually, drawing back the arm 16 and lever 14 and carrying the pawl 15 in the direction of the arrow *a*, Fig. 10, until the end of the arm 18 again escapes from the projection $x'$. The pawl therefore derives its motion from two sources—first, from the rotation of the shaft and the cross-arm carried by the shaft, which would give to the pawl and to the disk the same rate of rotation as the shaft, and, second, from the cam, which imparts to the pawl a progressive or forward-traveling movement in excess of that derived from the shaft—so that at the completion of the laying of each helix or upon each successive reversal of the movement of the guide the holder or cop will have turned not only the extent necessary to bring the point upon the cop-tube that was opposite the eye of the guide at the moment of the previous reversal back to its starting position, but will also have moved an additional extent, (corresponding to the movement imparted to the pawl by the cam,) whereby the said reversing-point on the holder will be circumferentially beyond that which was opposite the eye of the guide at the previous reversal at that end. As a result of this operation the reversal of the movement of the guide takes place not upon the exact completion of one or more rotations or rotations and parts of rotations of the holder, but only after the holder reaches a point at one end of the cop beyond that position which it occupied at the time the guide was reversed upon completing the helix previously laid, so that the thread held by the guide can be carried to the opposite end only by crossing the helix just previously laid. While it will be seen that the action of the cam is gradual and moves the disk constantly during the entire revolution at a speed slightly in excess of that derived from the shaft 7, this action might be momentary by substituting a radial pin for the cam, which pin would lift and drop the arm 18 in a fraction of a revolution.

It will be evident that that part of rotary movement imparted to the periphery of the cop by the reciprocation of the pawl, as above described, will be less when the cop is an inch in diameter than when the cop is four inches in diameter, and as a result if the movement when the cop is small in diameter is only sufficient to carry the thread across that of the previously-laid helix the movement when the cop is four inches in diameter would, if all the conditions were the same, be excessive. It is a fact, however, that when the cop is small in diameter the threads are laid upon the same and cross the previously-laid portions at a more acute angle to the axis than the angle at which they are laid and cross upon the larger surface of the cop as it increased, and consequently a greater length of thread is required to cross the thread previously laid at the periphery of the full-sized cop than is required to cross the thread laid upon the layers nearer the center or core of the cop. I have found in practice that this change in the angles of the thread laid upon the successive layers in forming the cop is such as will practically coincide with the increased throw or movement of the surface of the cop as the latter increases in diameter, so that practically it is not necessary to make use of any appliances for compensating for this difference in action, but that, on the contrary, said difference avoids the necessity of making special provision for a greater travel in consequence of the greater distance across the threads as their angle to the axis increases with the increased diameter of the cop. As the cop is clamped between the two disks constituting the holder, the above-described movements might be imparted to one of them only; but in order to secure certainty of operation I prefer to drive each of the disks through the medium of the appliances described and also to so set the parts that both pawls shall not change their movements at the same instant.

To hold stiff threads in position upon the cop being laid thereon, I make use of a presser-roller 4, carried by a frame F, consisting of a yoke-piece 25 and two parallel bars 26 26, sliding in a yoke 27, extending from and constituting part of the main frame A, the frame F, with its roller, being carried inward by means of a spring 29, connected with a lever 30 and holding the latter against a pin 37, extending from one of the bars 26. The guide 43 bears on the periphery of the cop, and as the cop increases in diameter the roller and the frame are forced outward. The said spring presser-roller, however, may be supported with a yielding pressure against the cop in any other suitable manner. The guide 43 is supported and reciprocated and maintained in its relation to the periphery of the cop as the latter increases in diameter by means of any suitable appliances. As shown, the said guide is supported by a carrier G, a cross-bar 31 of which slides in bearings upon the opposite side frames, while a projection at the forward end of the carrier slides in a transverse slot in a cross-bar 32. The carrier is provided with bearings for two slide-rods 33 33, upon which is a cross-piece 34, supporting the guide, and a hook 35 at the back of the cross-piece 34 extends back of the cross-bar 36 upon the frame F, so that as the frame F is pushed back by the increasing diameter of the cop the guide is carried outward to the same extent without interfering with the free travel of the guide back and forth across the face of the cop as the reciprocating motion is imparted to the carrier.

One means of imparting the reciprocating movement to the carrier is a cam-cylinder 52, secured to a shaft 12 and having a cam-slot 38, receiving a stud 39, projecting from the carrier.

In order to permit the tubes X to be inserted in the holder and the cops to be withdrawn, I so mount the shafts 7 that they can slide longitudinally in their bearings, the gear-wheels being of sufficient width to permit this movement without disengagement, and I provide means whereby said shafts may be separated to separate the parts 6 6 of the holder to receive the tube to allow the cop to be withdrawn and brought together to clasp the tube. Different means may be employed for sliding each of said shafts. As shown, a bell-crank lever 40, pivoted to the frame of the machine, has at one end a stud 41, extending into a groove 42 in the hub of one of the wheels upon the shaft at one side of the machine, while a similar bell-crank lever is similarly arranged on the other side of the machine, and the horizontal arms of both levers extend into slots in a push-bar 43, sliding in a cross-piece of the frame and bearing upon a spring 44, which tends to lift the push-bar and throw in the shafts and bring the disks to bear upon the tube. By pushing down the bar the spring is compressed and both shafts are thrown outward. If desired, however, one of the shafts can revolve in its bearings without sliding, the movement of the other in many cases being sufficient to permit the tube to be inserted and the cop withdrawn. The thread is conducted to the guide through a suitable tension device H and around a guide-pulley 50.

While I have referred to the movement of the holder and guide as one in which the reversing-point of each helix in effect advances circumferentially beyond a point where reversal would occur if there were no such progressive movement, substantially the like result would be obtained if the progression was backward—that is, if the holder as the guide completed its traverse turned one or more times minus the extent necessary to reverse each helix back of the reversing-point of the helix previously laid instead of in advance of the said point.

I have shown an apparatus for carrying out my improved systematic method of cop-winding which could be employed in winding by hand; but I do not claim said apparatus, as the same constitutes the subject of a separate application for Letters Patent, Serial No. 723,847, nor do I claim here the cop which is the subject of application Serial No. 723,846.

I claim as my invention—

The within-described systematic method of cop-building consisting—first, in definitely placing thread upon a holder in a helix extending from end to end, in the position on said holder it is to occupy in the finished cop; second, in bending the thread at each end to form an abrupt bend which occupies a position circumferentially beyond that at the opposite end; third, returning the thread in a reverse helix to the opposite end and crossing and tying down the thread of the first helix at one or more points between the ends of the cop; fourth, carrying the thread, at each end, with an abrupt bend over the portion previously laid at a point circumferentially different from that at which the helix started at that end; fifth, continuing these operations to lay the helices in contact with each other progressively on the core until the core is uniformly covered forming a single layer of two thicknesses of thread consisting of crossed helices; sixth, building successive layers upon the first, all having the same number of turns in the helices as the first; thereby forming a cop of the desired length and diameter, consisting of superposed similar layers of thread, each layer uniformly covering the layer below, and each composed of series of superposed crossed helices, each extending from end to end of the cop the helices successively bent back at the ends at different points circumferentially, substantially as described.

In testimony whereof I have signed my name in the presence of two subscribing witnesses.

SIMON W. WARDWELL, JR.

Witnesses:

THOMAS M. CHILDS,
EDWIN C. SMITH.